United States Patent
Haas et al.

(10) Patent No.: US 7,107,984 B2
(45) Date of Patent: Sep. 19, 2006

(54) COLLECTOR MODULE (75) Inventors: Gotfried Haas, Tirschenreuth (DE); Nikolaus Benz, Weiden (DE); Klaus Quast, Mitterteich (DE); Michael Reinhard, Ober-Olm (DE); Frank Schuenzel, Arzberg (DE)

(73) Assignee: Schott AG, Mainz (DE)

( * ) Notice: Subject to any disclaimer, the term of this patent is extended or adjusted under 35 U.S.C. 154(b) by 381 days.

(21) Appl. No.: 10/390,085

(22) Filed: Mar. 17, 2003

(65) Prior Publication Data

US 2003/0209281 A1 Nov. 13, 2003

(30) Foreign Application Priority Data

Mar. 19, 2002 (DE) ......................................... 102 12 977

(51) Int. Cl.
*F24J 2/50* (2006.01)

(52) U.S. Cl. ........................................ 126/652; 126/663
(58) Field of Classification Search ................. 126/652, 126/653, 655, 656, 663; 123/317, 311; 60/670, 60/682; 141/86
See application file for complete search history.

(56) References Cited

U.S. PATENT DOCUMENTS

| | | | | | |
|---|---|---|---|---|---|
| 3,952,724 | A | * | 4/1976 | Pei | 126/655 |
| 4,033,327 | A | * | 7/1977 | Pei | 126/655 |
| 4,212,293 | A | * | 7/1980 | Nugent | 126/711 |
| 4,319,561 | A | * | 3/1982 | Pei | 126/714 |
| 4,413,617 | A | * | 11/1983 | Dunlap et al. | 126/677 |
| 4,474,170 | A | * | 10/1984 | McConnell et al. | 126/636 |
| 4,579,107 | A | * | 4/1986 | Deakin | 126/654 |
| 5,555,878 | A | * | 9/1996 | Sparkman | 126/657 |

FOREIGN PATENT DOCUMENTS

| | | |
|---|---|---|
| DE | 43 08 626 C1 | 8/1994 |
| DE | 298 08 532 U1 | 11/1998 |
| DE | 299 08 190 U1 | 9/1999 |
| DE | 201 01 139 U1 | 8/2001 |
| DE | 100 11 812 A1 | 9/2001 |
| GB | 2 117 104 | * 10/1983 |
| WO | WO 81/00615 | * 3/1981 |

OTHER PUBLICATIONS

Patent Abstracts of Japan JP 60026245A2, Jul. 21, 1983.

* cited by examiner

*Primary Examiner*—S. Gravini
(74) *Attorney, Agent, or Firm*—Michael J. Striker (57) ABSTRACT

A collector module (1) is described with a collector manifold (20) having two chambers. This collector module (1) has at least one collector tube (2), which has an absorber tube (4) and a tubular jacket (3). A connector (40) for each collector tube is provided which embraces the collector manifold (20) and receives the end of its tubular jacket (3). The connector (40) has a cup-shaped receiving part (41) glued on its collector tube and a U-shaped connecting part (45) formed on the cup-shaped receiving part (41), which engages the collector manifold (20). A sealing device (60) is arranged on the U-shaped connecting part (45). A torsion-stiff, self-supporting device is provided accordingly by this structure, in which each collector tube is not loaded with external forces, during to thermal expansion, transport, mounting or the like.

15 Claims, 8 Drawing Sheets

COLLECTOR MODULE

BACKGROUND OF THE INVENTION

1. Field of the Invention

The present invention relates to a collector module comprising a collector device having two chambers, especially a collector manifold, which has at least one nipple arranged perpendicular to the collector device; at least one collector tube, which comprises an absorber tube and a tubular jacket, the absorber tube being slipped on the nipple; a coaxial tube being arranged in the nipple, which is fixed at one end in the absorber tube and at the other end in the collector device; and a connector surrounding the collector device and receiving the open end of the tubular jacket.

2. Description of the Related Art

A collector module of this type is known from German Utility Model G 201 01 139. The collector tube with its absorber tube is inserted in the nipple. Also the connector is constructed so that the collector tube can be inserted in it. All component parts are thus connected with each other by a plug connection. Because of this feature there is certain movability during thermal expansion of the parts. Different embodiments are described, which relate, among other things, to a force-locking and form-locking reception of the collector tube in the connector.

Although the collector tube is fixed in the connector that is designated a housing, rotation or twisting of the collector tube cannot be completely prevented. The housing receives the collector tube and forms a rigid framework with it. This structure has inherent disadvantages. The unavoidable pressing forces of the nipple via the O-rings and the hydraulic pressure of the heat transfer medium disadvantageously act on the collector tube. Also exterior forces act on the rigid housing due to thermal expansion of the collector tube, because the housing presses perpendicularly to the nipple on the collector tube. These types of forces can also occur during transport or mounting. Furthermore the nipple inserted in the collector tube can tilt or tip due to the existing degrees of freedom. These forces, which always act on the sensitive connection between the nipple and the collector tube, can increase the risk of breakage for the collector tube. If the degrees of freedom required to take care of that are provided, the required strength or rigidity for a self-supporting frameless structure for the module cannot be guaranteed without more.

SUMMARY OF THE INVENTION

It is an object of the present invention to provide a collector module of the above-described kind, which is improved so that a torsion-stiff, self-supporting device is provided and the collector tube—in the region where it connects with the collector device—is not loaded by external forces, resulting from thermal expansion, transport, mounting or assembly.

This object and others, which will be made more apparent hereinafter, are attained in a collector device having two chambers, especially a collector manifold, which has at least one nipple arranged perpendicular to the collector device; at least one collector tube, which comprises an absorber tube and a tubular jacket, the absorber tube being slipped on the nipple; a coaxial tube being arranged in the nipple, which is fixed at one end in the absorber tube and at the other end in the collector device; and a connector surrounding the collector device and receiving the open end of the tubular jacket.

According to the invention a respective connector is provided for each collector tube, which comprises a cup-shaped receiving part, in which the tubular jacket is glued in place, and a U-shaped connecting part, which embraces the collector device. Furthermore a sealing device is arranged in the U-shaped connecting part.

Because each collector tube has its own connector, external forces, e.g. because of thermal expansion of the collector device, are not transferred to the collector tube. In all cases during length changes of the collector device itself change the spacing of the collector tubes, or the connector itself shifts its position along the collector device.

The sealing device is constructed and arranged on the connector so that the collector device, especially the collector manifold, is either clamped or held slidably between the connector and the sealing device, whereby a torsion-stiff connection is formed with the collector device in all cases. The clamped or slidable attachment is adjusted by means of the internal dimensions of the connecting element and the sealing device in relation to the outer dimensions of the collector device.

The sealing device can be formed so that it can be opened or closed according to other embodiments, so that exchange or replacement of individual tubes is possible.

The gluing of the collector tube in the cup-shaped receiving element prevents the hydraulic pressure from pushing the collector tube away from the nipple. Also rotation of the collector tube around the central axis of the nipple is prevented. Furthermore the seal of the absorber tube, which occurs by means of one or two O-rings on the nipple, is not loaded with external forces, which increases the operational safety and service life. All forces, which are not directed parallel to the nipple axis, are considered to be external forces, including e.g. snow loads, unsuitable mounting or the like.

Preferably the collector tube is glued into the cup-shaped receiving part of its connector, so that the entire circular gap between the collector tube and the wall surrounding the collector tube is filled over its entire circumference. An adhesive is preferably used, which shrinks only slightly on hardening, in order to avoid tears or release. Especially a one or two-component glue with a silicone base should be considered for this purpose.

Although the collector tube is glued in the cup-shaped receiving part, this adhesive together with the O-ring seal at the nipple still provides a sufficiently flexible connection, so that the breakage risk during assembly and operation is reduced.

Another advantage of the adhesive connection of the collector tube in the cup-shaped receiving part is that the heat transfer liquid flows into the hollow space, which is formed by the tubular jacket, in every case of breakage of the interior tube (coaxial tube) in the absorber tube. This is also true in the case of nipple breakage. Thus the heat transfer medium is prevented from flowing out of the system.

The adhesive provides further that the required holding force is distributed uniformly over the circumference of the collector tube. Inequalities, which relate to small manufacturing-dependent tube curvature, are compensated.

The connecting part does not come in contact with the heat transfer medium and thus is not exposed to chemically reactive substances. This allows use of mostly economical plastic materials, which of course are heat-resistant, however are sensitive during contact with the heat transfer liquid, such as glass-fiber-reinforced polyamide.

In preferred embodiments of the invention the sealing device is a slider movable in the longitudinal direction of the collector device, particularly the collector manifold. The U-shaped connecting element preferably has two arms with respective locking elements on their free ends cooperating with corresponding locking elements of the slider.

These locking elements, for example, can be tongues and grooves, which extend preferably in the longitudinal direction of the collector device.

In an alternative embodiment the sealing device is a pivoting element pivotally connected to the U-shaped connecting part. This pivoting element preferably pivots about a pivot axis that extends in the longitudinal direction of the collector device on opening, so that replacement or exchange of the collector tube together with the connecting part is possible. Providing a pivoting or hinge element has the advantage that the sealing device remains on the U-shaped connecting part and cannot be lost during the replacement or exchange. This pivoting element is preferably pivotally connected to an arm of the U-shaped connecting part by means of a hinge. It preferably locks in a suitable member on the opposite arm of the U-shaped connecting part. Also this pivoting element is formed so that the collector device, especially the collector manifold, is held clamped or slidable in the locked state.

Preferably the width of the U-shaped connecting part extending in the longitudinal direction of the collector device is less than the outer diameter of the cup-shaped receiving element. The width may not be selected so that it is so small that no torsion-stiff connection is provided. Preferably the width B of the U-shaped connection part is in a range from D/3 to D, where D is the diameter of the cup-shaped receiving part.

The space required in the longitudinal direction of the collector device is thus determined by the cup-shaped receiving element. This has the advantage that a free space remains between the connecting parts on the collector device, so that two collector devices can be connected with each other without difficulties and without requiring considerably larger spacing of the collector tubes on the collector devices. The connection between the two collector modules does not lead to substantially larger tube spacing than within a single module. Because of the equal tube spacing in the collector field the entire arrangement of several collector modules is compact and thus the thermal yield per gross surface area is increased.

Preferably the cup-shaped receiving part has opposing side walls on its outer sides in the longitudinal direction of the collector device and respective locking members or elements on these side walls, which cooperate with corresponding locking members or elements on neighboring cup-shaped receiving parts. Neighboring collector tubes in this embodiment are pulled toward each other in this embodiment so that neighboring side walls of the cup-shaped receiving parts bear on each other. The torsion-stiffness is considerably increased because of the locking of the opposite sides. In this embodiment sealing and connecting parts are preferably formed so that the collector device, especially the collector manifold, is slidably held.

At the same time these locking members or elements permit a release or unlocking without problems. This is especially true when the locking members or locking elements are tongues and grooves, which extend in the longitudinally direction of the collector tube. For replacement of a collector tube the sealing device is opened and the collector tube with the connector is pushed in the longitudinal direction, whereby the locking elements of the cup-shaped receiving part slip out from the locking elements of the neighboring cup-shaped connecting parts. Similarly a new collector tube with suitable connector can be easily inserted into the arrangement.

Preferably a roof-attaching element is arranged in a transition region between the cup-shaped receiving part and the U-shaped connecting part. This roof-attaching element preferably comprises at least one circular element with a through-going hole extending perpendicular to the longitudinal axis of the connecting part. A bolt or the like may be inserted through this through-going hole and attached, which makes the connection to the roof via a suitable retaining member or device.

In order to increase the torsion-stiffness further, a foot cap is glued on each collector tube. These foot caps similarly have locking members or elements similar to those on the cup-shaped receiving part, which cooperate with locking members or elements on neighboring foot caps. Preferably these locking members or elements are tongues and grooves, which are preferably arranged in the longitudinal direction of the collector manifold. Because of that the locking members or elements of the cup-shaped receiving part and of the foot caps are released with a single motion during replacement of the collector tube.

The foot caps preferably have a base with retaining elements, with which the foot caps grip the roof with a suitable attachment device. These retaining elements preferably are fixed to a suitable bar or girder, which is mounted on the roof. This arrangement is preferably designed, so that shifting of the base compensates for length expansion.

BRIEF DESCRIPTION OF THE SEVERAL VIEWS OF THE DRAWING

The objects, features and advantages of the invention will now be illustrated in more detail with the aid of the following description of the preferred embodiments, with reference to the accompanying figures in which.

DETAILED DESCRIPTION OF THE INVENTION

Figure 1:
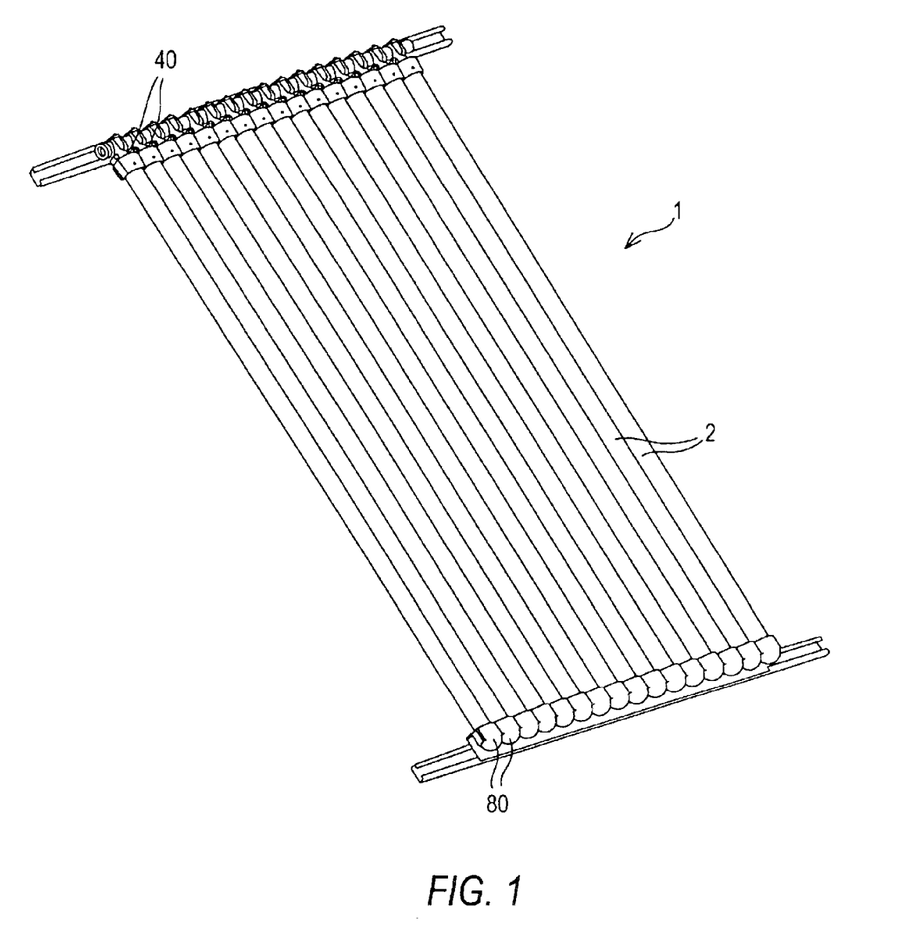
FIG. 1 is a perspective view of a collector module with collector tubes, connectors and foot caps.

A collector module 1 with collector tubes 2 is shown in FIG. 1. The collector tubes 2 have connectors 40 connected individually with each other at their head ends and foot caps 80 connected individually with each other at their foot ends.

Figure 2:
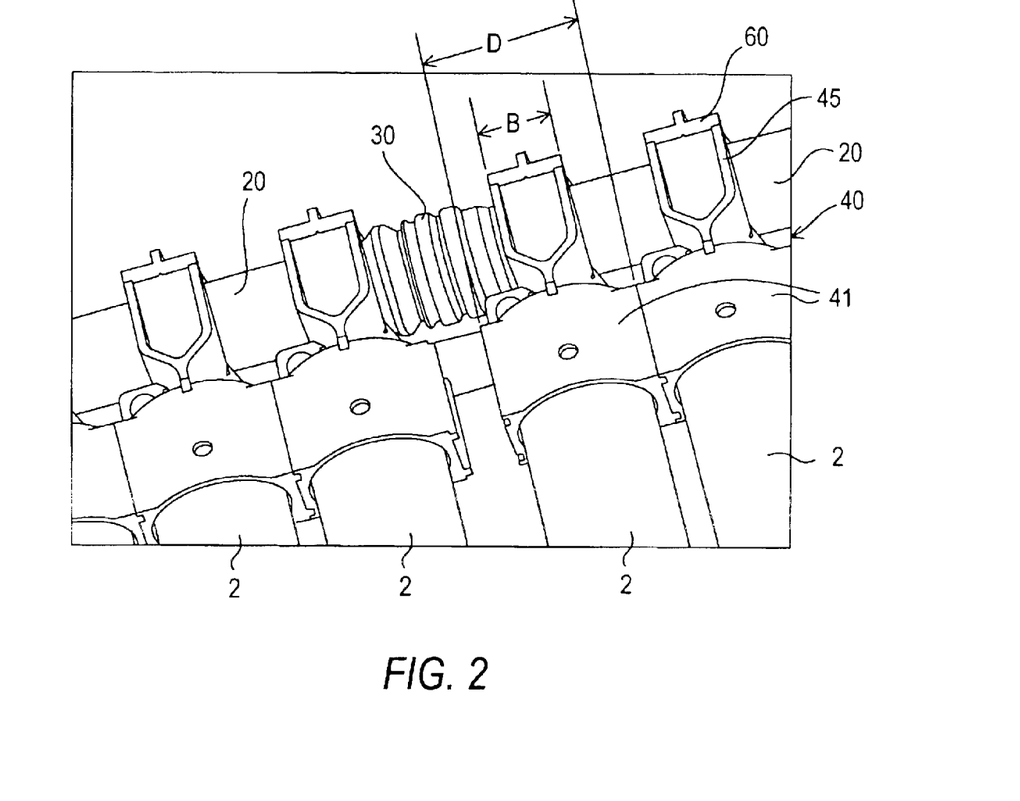
FIG. 2 is a detailed cutaway view of the collector module in the vicinity of the connectors.

An enlarged view of a portion of the collector module is shown in FIG. 2 in its head region, so that the connectors 40, described in detail in the following, can be seen more clearly. A connector 40 has a cup-shaped receiving part 41, in which the collector tube 2 is glued. In the direction of the collector device, which here is shown as a collector manifold 20, a U-shaped connecting part 45 connects to the collector tube. The U-shaped connecting part 45 embraces the collector manifold 20 and cooperates with a suitable sealing element 60. As shown in FIG. 2 the width B of the U-shaped connecting part 45 is clearly less than the diameter D of the cup-shaped receiving part 41, so that a free space remains between two neighboring connecting parts 45. Thus a collector manifold connection can be arranged there without noteworthy enlargement of the tube spacing along the collector manifold 20.

Figure 3:
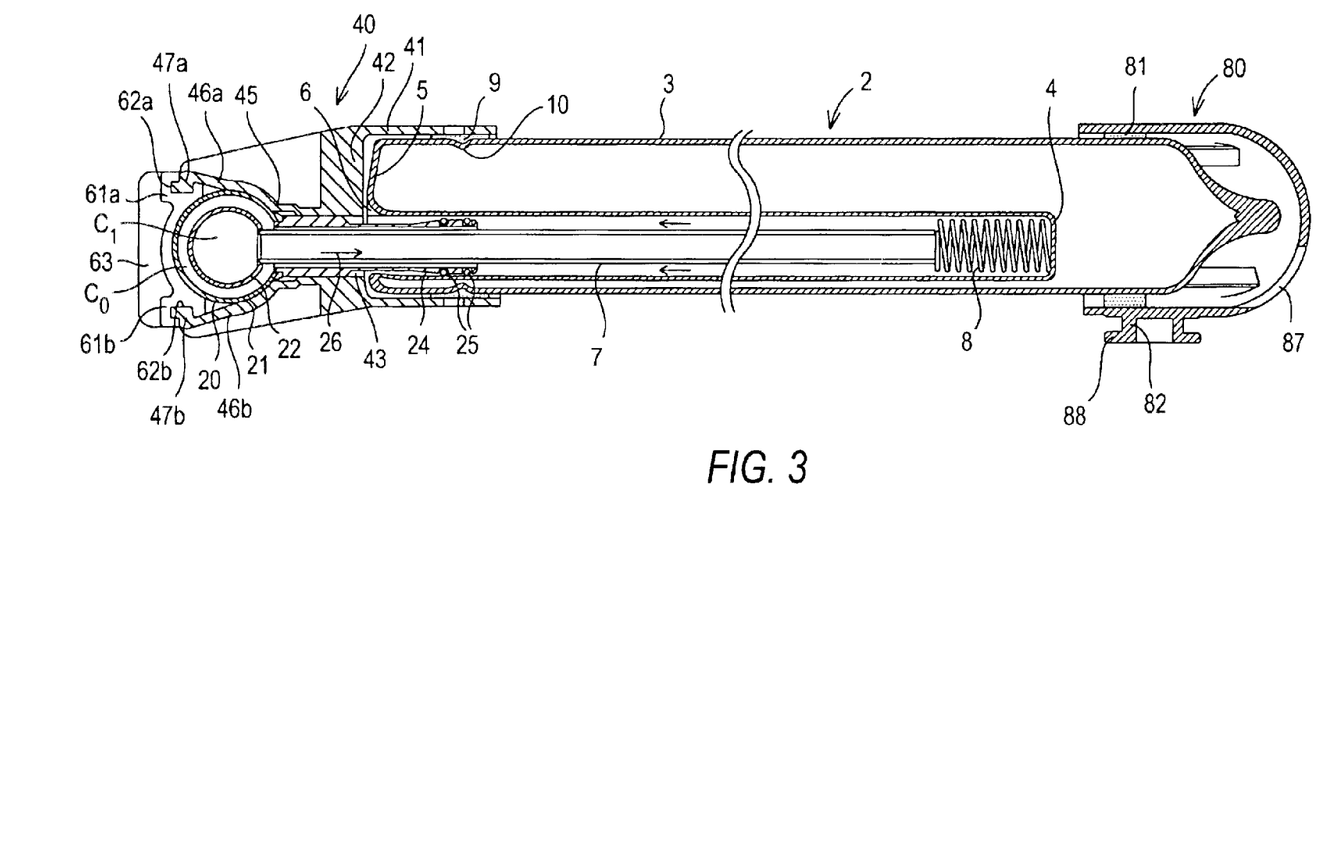
FIG. 3 is a longitudinal cross-sectional view through a collector tube with connectors and foot caps.

A cross-sectional view through the collector tube 2 with connector 40, collector manifold 20 and foot caps 80 in place is shown in FIG. 3. The collector tube 2 comprises a tubular jacket 3, which is connected by fusion with an inner absorber tube 4 by connecting wall 5. This structure for the collector tube 2 is known in the prior art. The interior of the absorber tube 4 is thus accessible at the opening 6, so that a coaxial tube 7 and a nipple 24 can be inserted therein.

The collector manifold 20 comprises an outer tubular wall 21 and a coaxial interior tube 22, so that two chambers $C_I$ and $C_O$ for inflow and outflow of heat transfer medium are formed in it. Several nipples 24 are arranged on this collector manifold 20. One of these nipples 24 is shown in FIG. 3, which extends into the absorber tube 4, where a seal is formed by means of two O-rings 25 arranged on the outside of the nipple 24. Furthermore the coaxial tube 7, which at one end sits tightly on the opening of the inner tube 22 and at the other end is braced on a spring 8 arranged in the absorber tube 4, is inserted in the interior of the nipple. Thus the coaxial tube 7 is securely held in place. The heat transfer medium flows in the direction of the arrow 26 through the coaxial tube 7, reverses direction in the vicinity of the spring 8 and flows in the direction of the arrow 27 to the outer end of the coaxial tube again into the collector manifold 20.

The connector 40 has a cup-shaped receiving part 41, in which the tubular jacket 3 is glued by means of a layer 9 of adhesive. The adhesive layer 9 does not extend in this embodiment over the entire inner surface of the cup-shaped receiving part 41, because the tubular jacket 3 has a circumferential bead 10 and an adhesive layer in this region is sufficient in order to guarantee a secure attachment of the collector tube 2. An opening 43 in the bottom wall 42 of the cup-shaped receiving part 41 is provided for receiving the nipple 24. On the end opposite from the mouth of the cup-shaped receiving part 41 the U-shaped connecting part 45 is provided. The U-shaped connecting part 45 has two arms 46a, 46b, which engage or embrace the collector manifold 20 like a pair of jaws. Respective locking elements 47a, 47b are provided on the corresponding free ends of both arms 46a, 46b. In the embodiment shown in the drawing these locking elements are tongues and cooperate with corresponding locking elements 62a, 62b on the respective legs 61a, 61b of the sealing element 60. These latter locking elements 62a, 62b are grooves. The tongues and grooves extend longitudinally in a longitudinal direction $L_s$ of the collector manifold. A handle 63 is arranged on the exposed outer wall of the sealing element 60. The sealing element 60, formed like a slider, can be pushed in the longitudinal direction $L_s$ of the collector manifold by means of the handle 63, in order to release or unlock it so that the collector pipe 2 together with the connector 40 can be removed from the nipple 24 and the collector manifold 20.

The foot caps 80 are arranged on the opposite end of the collector tube 2. They can comprise a similar cup-shaped receiving part, in principle. The collector tube 2 and/or the tubular jacket 3 of the collector tube 2 is (or are) glued in this foot cap 90 with an adhesive layer 81. The foot cap 80 has a base 82 at its lower end. The base 82 has a retaining element 88, which can be used to attach the collector module to a roof. An outlet opening 87 is provided in the lower curved region of the foot cap wall, so that rain water collecting between the collector tube 2 and the foot cap 80 can eventually run away unhindered. This is especially advantageous when the collector module is mounted on a slanting roof in an inclined orientation.

Figure 4:
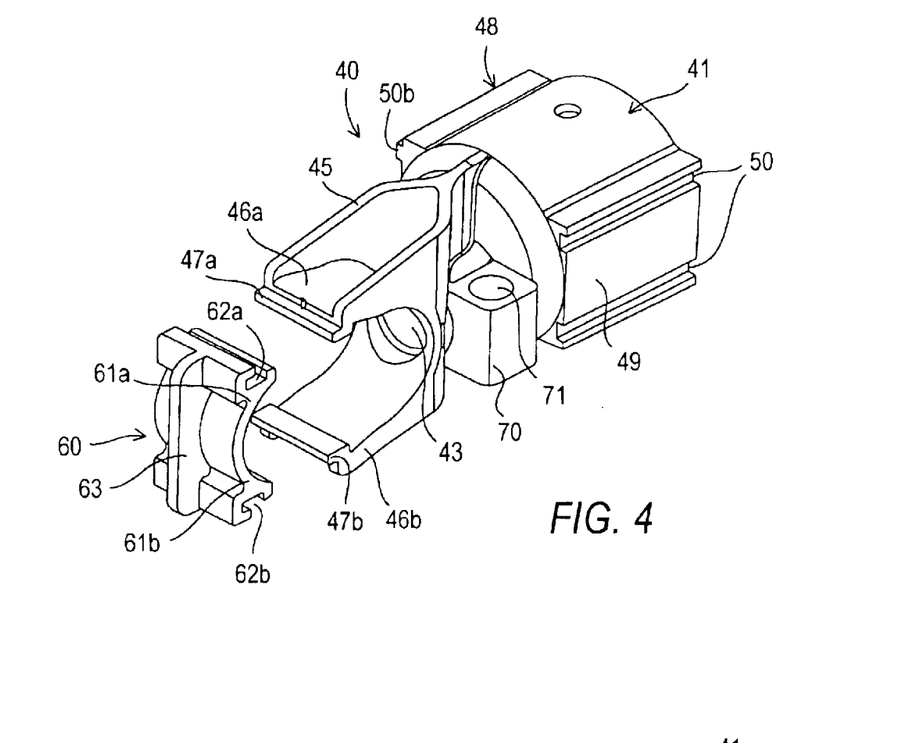
FIG. 4 is a perspective view of a connector with sealing device.

A perspective view of a connector 40 is shown in FIG. 4. The cup-shaped receiving part 41 has locking elements in the form of grooves and tongues 50a, 50b on opposite side walls 48 and 49 arranged side-by-side in the longitudinal direction of the collector manifold 20. Both side walls 48 and 49 are plane parallel.

As shown in FIG. 2, neighboring side walls 48 and 49 of two neighboring cup-shaped receiving element 41 bear directly on each other, so that the tongues of one of the adjacent side walls engage in the grooves of the other adjacent side wall. Thus the connectors 40 are locked with each other and form a stable arrangement.

In the transition region between the cup-shaped receiving part 41 and the U-shaped connecting part 45a roof-attaching element 70 in the form of a ring element with a through-going opening 71 is provided (see FIG. 4). The through-going opening 71 extends perpendicular to the longitudinal axis $L_c$ of the connector 40, so that a bolt or similar attaching element can be inserted through it and thus facilitate attachment to a roof. An additional roof-attaching element 70 can be arranged on the opposite side, but it is usually sufficient to provide one of these roof-attaching elements 70 for each connector 40. Locking elements 47a, 47b are arranged on both arms 46a, 47b of the U-shaped connecting part 45, which comprise tongues in the embodiment shown in the drawing. The associated sealing element 60 is similarly curved and has two legs 61a, 61b on whose outer sides two grooves 62a, 62b are arranged as respective locking elements, in which the corresponding locking elements 47a, 47b of the U-shape connecting part 45 engage. Thus it is formed like a slider, which can be slid in the longitudinal direction of the collector manifold 20, in order to release the attachment of the connector 40 from the collector manifold 20. For this purpose a handle 63 is preferably formed on the outer side.

Figure 5:
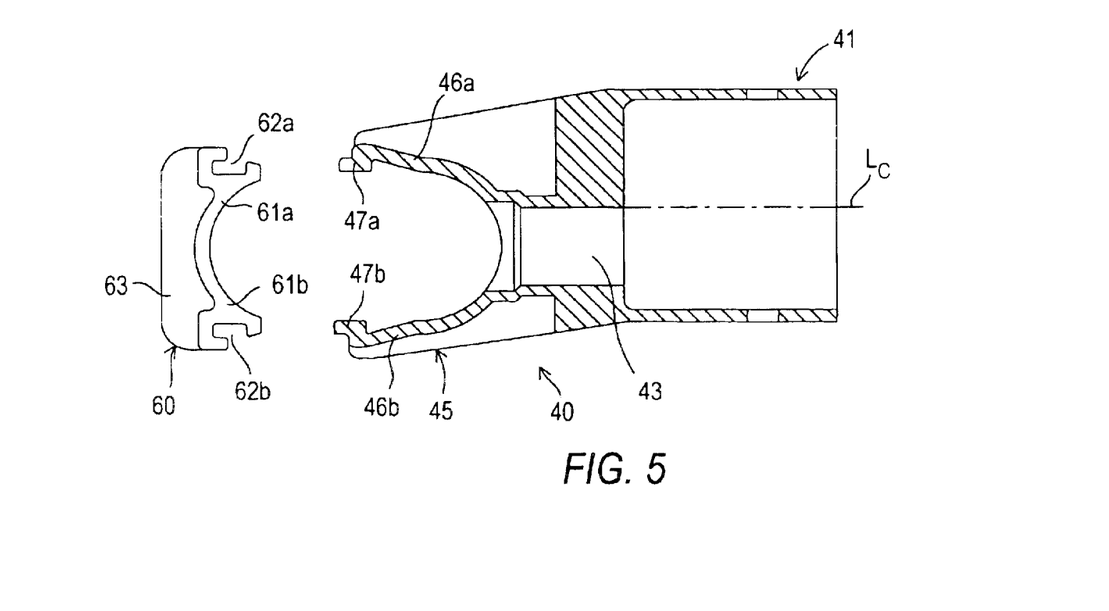
FIG. 5 is a cross-section through the connector shown in FIG. 4.

In FIG. 5 a cross-section through a connector 40 is illustrated.

Figure 6:
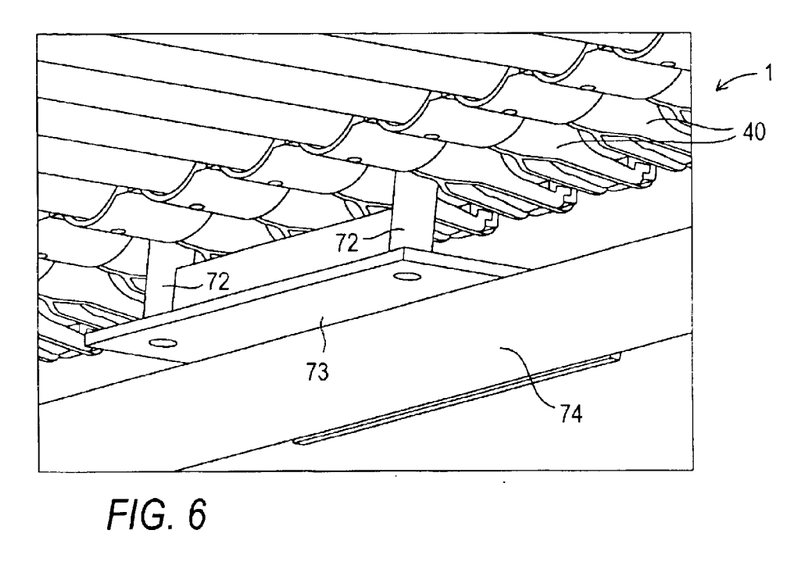
FIG. 6 is a perspective view of an underside of a portion of the collector module with means for mounting the collector module on a roof.

FIG. 6 shows the underside of a collector module 1 in a cutaway view. Respective bolts 72 are inserted through the through-going holes 71 of the roof-attaching element 70 of two connectors 40, which are screwed into a L-shaped section 73. This L-shaped section 73 bears on a bar 74, which extends parallel to the longitudinal direction of the collector manifold 20, and is rigidly attached to it be screwing. When two adjacent collector modules are attached by this L-shaped section 73, they can shift or slide with respect to each other in collector connection 30 during thermal expansion of the collector manifolds 20.

Figure 7:
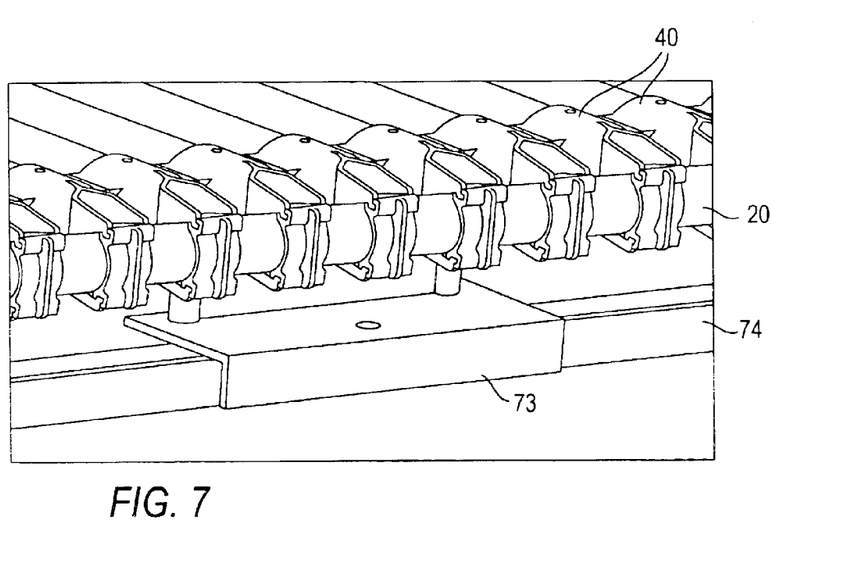
FIG. 7 is a top view of the arrangement shown in FIG. 6, especially the means for mounting on the roof.

FIG. 7 is a top or plan view of the arrangement shown in FIG. 6.

Figure 8:
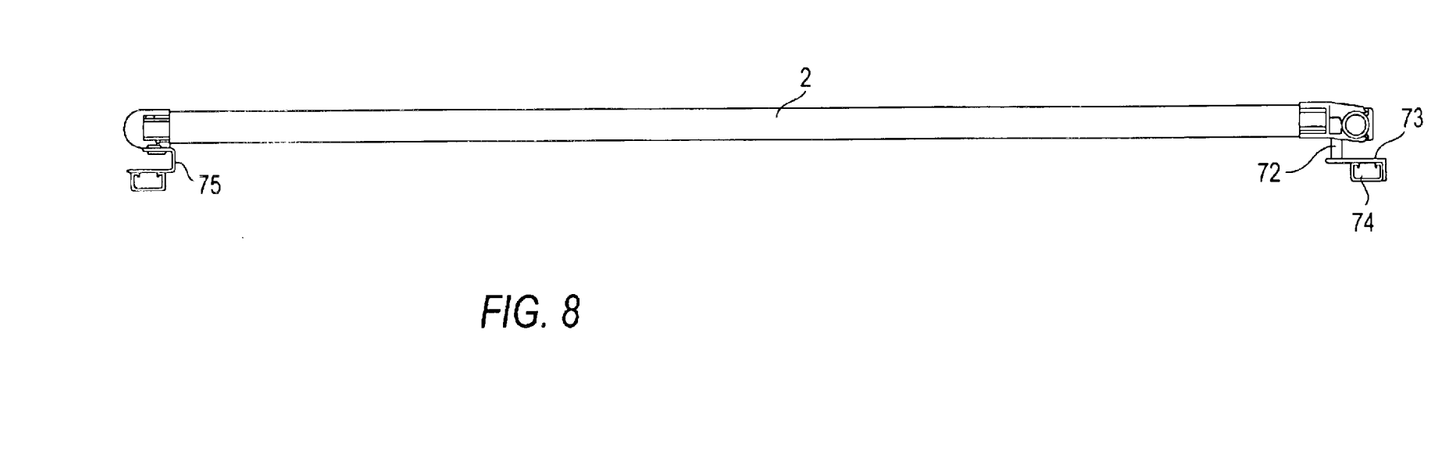
FIG. 8 is a side view of the collector module with suitable roof mounting means.
Figure 9:
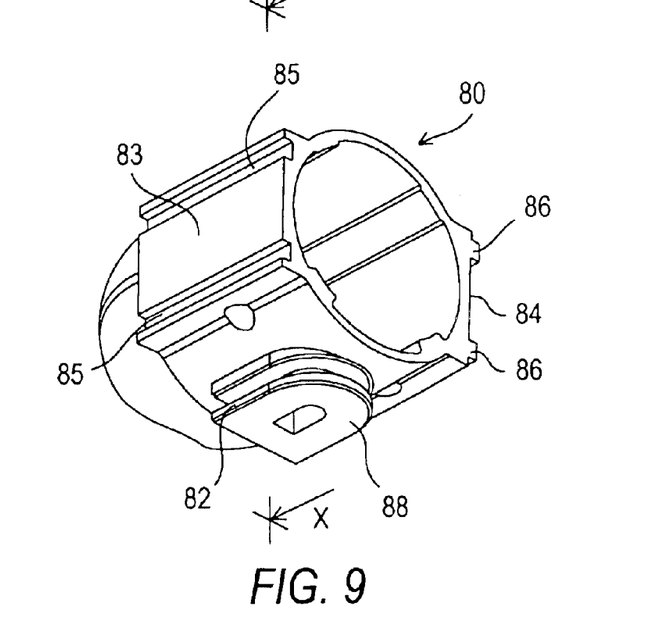
FIG. 9 is a perspective view of a foot cap.
Figure 10:
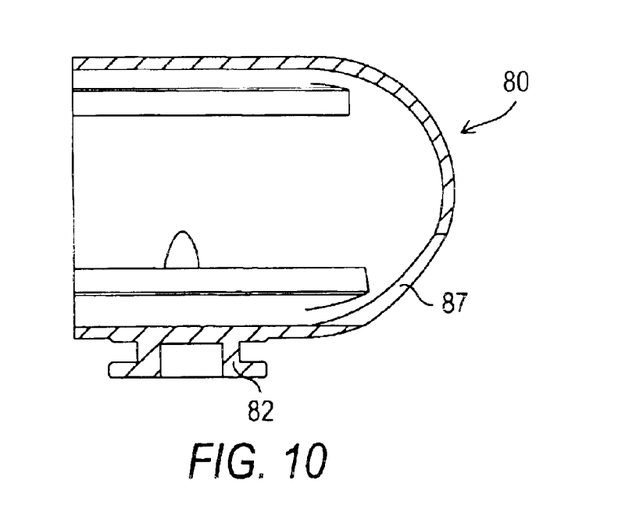
FIG. 10 is a longitudinal cross-sectional view through the foot cap shown in FIG. 9 taken along the line X—X.

A collector tube 2 together with a roof-attaching device is shown in FIG. 8. A bolt 72 is fixed in a through-going opening 71 and is screwed into the L-shaped section 73. This section 73 bears on the bar 74. The short leg bears on the outer side of the bar 74 and forms a stop. On the foot ends a U-shaped curved bar 75 is provided, on which the foot caps 80 are mounted with their bases 88. The bar 75 is attached to another bar 74. In this type of roof attachment the collector tube 2 is held under tension between the bars, In FIG. 9 a perspective view of the bottom side of a foot cap 80 is shown. The foot caps have two plane-parallel outer walls 83 and 84 opposite each other, on which locking elements 85 and 86 in the form of respective tongues and grooves are arranged. Thus a suitable arrangement like the arrangement in the case of the cup-shaped receiving part 41 results so that connection with neighboring foot caps 80 is possible. A base 82 is formed on the underside, which can be connected with a U-shaped bar 75 by means of a plate-shaped retaining element 88. The outlet opening 87 is formed on the rear lower region, which has already been illustrated in connection with FIG. 3 and in FIG. 10.

Figure 11:
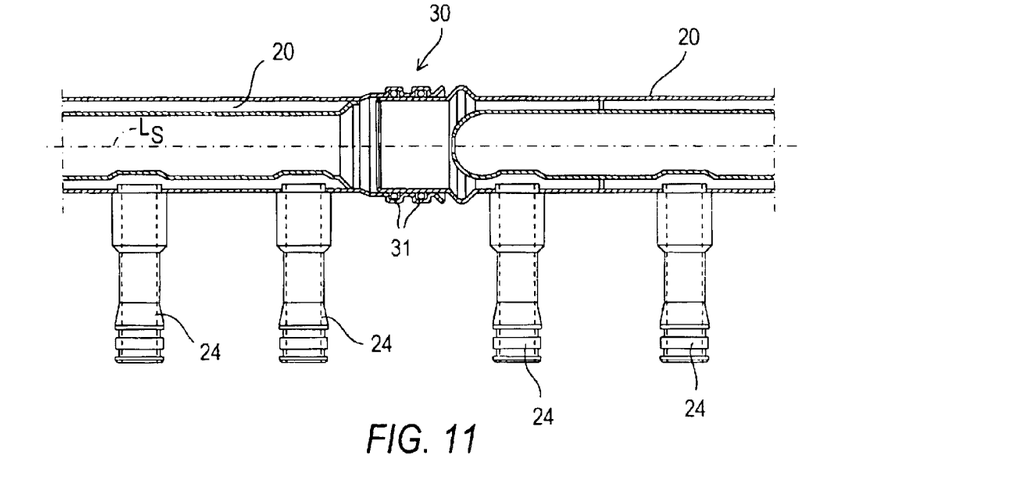
FIG. 11 is a cutaway cross-sectional view showing a connection between two collector modules.

The collector connection 30 of two collector tubes 20, which are inserted in each other, is shown in FIG. 11. The connection 30 is sealed by two O-rings 31.

Figure 12A:
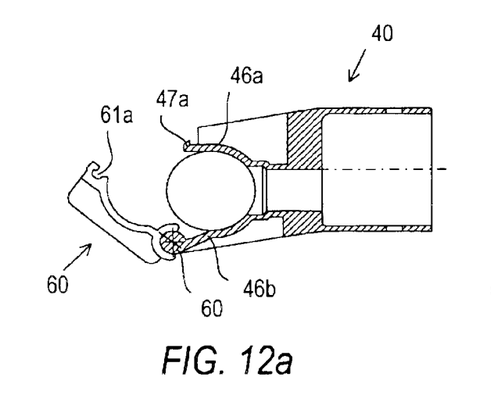
FIGS. 12a and 12b are cross-sectional views through a connector with a sealing device according to an additional embodiment in an open state and in a closed state respectively.
Figure 12B:
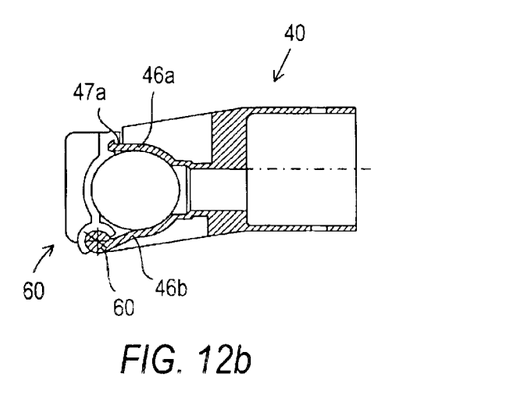

In FIG. 12 an additional embodiment of a connector 40 is shown, which is different from the embodiment shown in FIG. 4. The sealing element 60 is pivotally connected at a free end of the lower arm 46b by means of a hinge 64. A locking element 47a is arranged on the upper arm 46a, which locks with the corresponding locking element 61a on folding the sealing element 60 and thus takes the closed position shown in FIG. 12b.

The disclosure in German Patent Application 102 12 977.0 of Mar. 19, 2002 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in a collector module, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

We claim:

1. A collector module comprising
    a collector device, especially a collector manifold, provided with two chambers and having at least one nipple arranged perpendicular to a longitudinal direction of the collector device;
    at least one collector tube, said at least one collector tube comprising an absorber tube and a tubular jacket arranged around the absorber tube, the at least one absorber tube being slipped on said at least one nipple of the collector device;
    at least one coaxial tube arranged in the nipple and fixed at one end thereof in the absorber tube and at another end in the collector device;
    a respective connector for each of said at least one collector tube, said respective connector encompassing the collector device, said respective connector having a cup-shaped receiving part, in which the tubular jacket of said at least one collector tube is received and glued, and a U-shaped connecting part, which embraces the collector device; and
    a sealing device arranged on the U-shaped connecting part of said respective connector.

2. The collector module as defined in claim 1, wherein the collector device is said collector manifold and the sealing device is a sliding element movable in the longitudinal direction of the collector device.

3. The collector module as defined in claim 2, wherein the U-shaped connecting part has two arms and respective locking elements on free ends of said two arms and the slider element has corresponding locking elements cooperating with said respective locking elements of said connecting part.

4. The collector module as defined in claim 3, wherein the respective locking elements on the two arms of the U-shaped connecting part and the corresponding locking elements of the slider comprise grooves and tongues.

5. The collector module as defined in claim 4, wherein said tongues and grooves extend in the longitudinal direction of said collector device.

6. The collector module as defined in claim 1, wherein the sealing device is a pivoting element pivotally mounted on the U-shaped connecting part.

7. The collector module as defined in claim 1, wherein a width of the U-shaped connecting part in the longitudinal direction of the collector device is less than an outer diameter of the cup-shaped receiving part.

8. The collector module as defined in claim 1, wherein said at least one collector tube consists of at least two collector tubes; and each cup-shaped receiving part of said at least two collector tubes has opposing side walls spaced from each other in a collector device direction and respective locking members arranged on outer sides of said side walls, which cooperate with corresponding locking members arranged on neighboring cup-shaped receiving parts.

9. The collector module as defined in claim 1, wherein said connector has a roof-attaching device arranged in a transitional region between the cup-shaped receiving part and the U-shaped connecting part.

10. The collector module as defined in claim 9, wherein said roof-attaching device comprises at least one ring element provided with a through-going opening extending perpendicular to a longitudinal axis of the connector.

11. The collector module as defined in claim 1, further comprising a respective foot cap glued on a closed end of each of said at least one collector tube.

12. The collector module as defined in claims 11, wherein said foot cap is provided with a run off opening.

13. The collector module as defined in claim 11, wherein said foot cap has side walls on opposite outer sides and locking members arranged on said side walls of said foot cap, and said locking members comprise means for cooperating with corresponding locking means provided on neighboring foot caps.

14. The collector module as defined in claim 13, wherein said locking members provided on said foot cap comprise tongues and grooves.

15. The collector module as defined in claims 13, wherein said foot cap has a base with at least one retaining element.

* * * * *